US008723756B2

(12) United States Patent  
Kim (10) Patent No.: US 8,723,756 B2  
(45) Date of Patent: May 13, 2014

(54) SYSTEM HAVING CAPABILITY FOR DAISY-CHAINED SERIAL DISTRIBUTION OF VIDEO DISPLAY DATA

(75) Inventor: Jechan Kim, Cupertino, CA (US)

(73) Assignee: Synaptics Incorporated, San Jose, CA (US)

( * ) Notice: Subject to any disclaimer, the term of this patent is extended or adjusted under 35 U.S.C. 154(b) by 1655 days.

(21) Appl. No.: 12/014,341

(22) Filed: Jan. 15, 2008

(65) Prior Publication Data

US 2009/0182917 A1    Jul. 16, 2009

(51) Int. Cl.  
    G09G 5/00    (2006.01)
(52) U.S. Cl.  
    USPC .............................. 345/1.3; 345/1.1; 345/2.2
(58) Field of Classification Search  
    CPC ... G06F 3/1423; G06F 3/1431; G06F 3/1446; G06F 3/147  
    USPC .......................... 345/1.1–3, 96–100, 204–215  
    See application file for complete search history.

(56) References Cited

U.S. PATENT DOCUMENTS

| 6,191,760 | B1 | 2/2001 | Jun et al. |
| 6,323,854 | B1 | 11/2001 | Knox et al. |
| 6,384,846 | B1 * | 5/2002 | Hiroi .............................. 715/794 |
| 6,397,275 | B1 * | 5/2002 | Clapp et al. ..................... 710/60 |
| 6,411,302 | B1 * | 6/2002 | Chiraz .......................... 345/545 |
| 6,681,001 | B1 * | 1/2004 | Clayton et al. ............. 379/93.05 |
| 7,027,058 | B2 | 4/2006 | Tomooka et al. |
| 8,237,624 | B2 | 8/2012 | Zeng et al. |
| 2002/0118144 | A1 | 8/2002 | Edmonds |
| 2004/0046707 | A1 | 3/2004 | Mori et al. |
| 2009/0322767 | A1 | 12/2009 | Douglas et al. |

FOREIGN PATENT DOCUMENTS

| CN | 1189736 A | 8/1998 |
| EP | 2 254 038 A2 | 11/2010 |
| JP | 2004-102027 A | 4/2004 |
| JP | 2005-130520 A | 5/2005 |

OTHER PUBLICATIONS

Notice of Reasons for Rejection mailed Jan. 8, 2013, in related Japanese Patent Application No. 2011-508503.  
VESA: DisplayPort Standard, Version 1.1, Mar. 19, 2007, pp. 1-228.  
International Search Report (ISR) and the Written Opinion dated Sep. 21, 2009, in related International Application No. PCT/US2009/002811.  
International Preliminary Report on Patentability (IPRP) and the Written Opinion dated Nov. 18, 2010, in related International Application No. PCT/US2009/002811.  
First Office Action mailed Jan. 25, 2013, in related Chinese Patent Application No. 200980126392.3.

* cited by examiner

Primary Examiner — Vijay Shankar  
(74) Attorney, Agent, or Firm — Osha Liang LLP (57) ABSTRACT

A serial display interface such as the VESA-Display Port interface is expanded to support daisy chained coupling of one display monitor to the next. Each daisy chain wise connectable display monitor (except optionally the most downstream one on the daisy chain) has a local daisy chain transceiver device associated with it where the local transceiver device routes a selectable one or more video data streams to the local monitor and the local transceiver device relays on to more downstream devices of the daisy chain other video data streams. In one embodiment, the daisy chain wise connectable display monitors are hot-pluggable and unpluggable.

24 Claims, 5 Drawing Sheets

SYSTEM HAVING CAPABILITY FOR DAISY-CHAINED SERIAL DISTRIBUTION OF VIDEO DISPLAY DATA

FIELD OF DISCLOSURE

The present disclosure of invention relates generally to video display and distribution systems. The disclosure relates more specifically to serial transmission of high definition video signals from a source device to one or more sink devices.

DESCRIPTION OF RELATED TECHNOLOGIES

Recently video display technologies have been improving to the point where it is possible for home users to attach a high definition display panel to their home computer or home theatre entertainment center. A number of reconfigurable interconnects schemes have been proposed which allow users to upgrade their display panels from those of low resolution to higher resolution ones as newer display technologies (e.g., high definition displays) become available.

For example, the Video Electronics Standards Association (VESA) approved in April 2007 a version 1.1 of a serial transmission based interface known as Display Port (the VESA-DP 1.1 specification). Both the earlier and 1.1 version VESA-DP protocols call for a cable and a pair of interconnects (plugs) that support up to four lanes of serial data transmission from a video source device to a video sink device. In addition there is a fifth, or so-called auxiliary channel which supports serial transmission of bidirectional control data. Each of the four video data lanes is required to have a bandwidth of at least 1.62 gigabits per second supported over a cable length of at least 15 meters, or optionally upgraded to 2.7 Gbit/s per lane for higher resolution but supported over a shorter cable of at least 3 meters in length.

If a video signal is transmitted over only a single lane, that transmission should be sufficient to support a medium resolution video sink device of 1080 pixels per scan line (by 800 horizontal lines) at 24 bits per pixel and 50 or 60 frames per second. If the video resolution of the sink device is doubled both vertically and horizontally to as much as 2,560 pixels per horizontal line by 1,600 horizontal lines per frame, then all four transmission lanes of the VESA-DP interconnect are used to transfer the video data digitally. The fifth auxiliary channel carries control data for coordinating the interlacing or other mixing of the first four channels. Bandwidth is additionally provided for a maximum of 8 channels of uncompressed audio signal transmitted at 6.144 megabits per second on a time shared basis. In one embodiment a differential 3.3 volt drive is used for each of the lanes. A 20 pin external connector is provided where 10 of the pins are dedicated for supporting the differential signal drive pairs for the four lanes and the auxiliary channel. The remaining pins provide ground shields, hot plug detection and connector-supplied power as well as a connector power return.

The VESA/DP 1.1 protocol is not the only one that supports serial transmission of video data. Other protocols used within the industry include the Unified Display Interface (UDI), the Digital Video Interface (DVI) and the High Definition Media Interface (HDMI). A number of these protocols, including the VESA/DP protocol support content copy protection (CP) by use of various encryption techniques. The VESA Display Port Content Protection (DPCP) scheme uses a 128-bit AES encryption technique. The HDMI protocol uses a slightly different protection technique known as HDCP.

As of late, a number of large companies in the industry have begun to support the VESA/DP protocol as the main protocol for transmitting high definition video or lower resolution video from a computer or a home theatre entertainment center to a high definition display panel or to a lesser monitor. The present disclosure will focus on the VESA/DP protocol. However it is to be understood that disclosure is not limited to this one protocol alone and its teachings may be applied to other multi-lane serial video distribution systems.

Aside from the introduction of new video connector protocols (e.g., VESA-DP), another recent trend in the industry has been the use to plural video monitors in certain applications. For example, some power computer users require large amounts of application desktop space for their software programs. Various computers, including laptop computers, generally come with at least one external video jack for supporting an external or auxiliary monitor in addition to the main monitor supported by an internal video connection or a primary video jack. Software is available so that the additional or auxiliary monitor can be used simultaneously with the main monitor and so that the display space of the auxiliary monitor can supplement the limited display space provided by the main monitor.

However for some special applications, two monitors alone may not be enough. So-called power users may clamor for an even larger number of display monitors besides the usual two driven by their special purpose software. Satisfaction of this desire for more display area is difficult to realize, particularly in the case of laptop computers because there is only so much connector space available on the motherboard of the laptop (or desktop) computer and because the addition of further video connectors and supporting circuitry becomes relatively expensive. Not all users are power users who will employ the additional video jacks plus hardware. So for them, the addition of more video jacks and associated hardware is a cost with no apparent benefit.

SUMMARY

Structures and methods may be provided in accordance with the present disclosure of invention for improving over the above-described problems relating to the allowing of display of different images on respective ones of plural display monitors.

More specifically, in accordance with one aspect of the present disclosure, a digital display monitor is provided with two VESA-DP connectors, one for plug-wise receiving a plurality of serial video lane signals and the second for forwarding (relaying) all or a selected subset of the received video signals to yet a further monitor that is plug-wise removably connected daisy chain style with the first monitor.

More specifically, in one embodiment, a VESA-DP compatible transceiver circuit (e.g., a monolithic integrated circuit chip) is provided as a dynamically programmable relaying circuit that operates in a first mode as a conventional VESA-DP sink circuit. It operates in a second programmably selected mode as a serial data router that selectively picks off some of passing-through data for local display and relays the remaining data to a next-in-chain VESA-DP compatible transceiver circuit or sink circuit for possible display at that next locale and/or for further relaying of the video signals along the daisy chain to yet other display monitors. In one embodiment, relayed signals are shifted towards Lane 0 as they are relayed downstream along the daisy chain so that the last in line display monitor can use a conventional VESA-DP sink circuit.

Other aspects of the disclosure will become apparent from the below detailed description.

BRIEF DESCRIPTION OF THE DRAWINGS

The below detailed description section makes reference to the accompanying drawings, in which:

FIG. 4 is a second signal flow diagram showing how video signals may be routed and distributed daisy-chain style to plural display units with a system similar to that shown in FIG. 3A and FIG. 4 is also a diagram showing auxiliary channel packets structured in accordance with the disclosure.

DETAILED DESCRIPTION

Figure 1A:
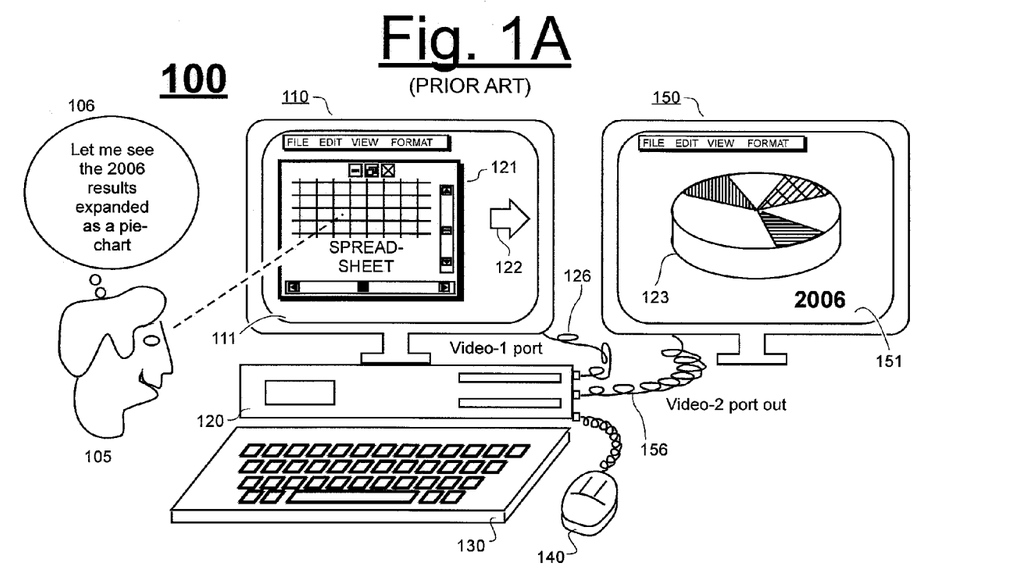
FIG. 1A is a block diagram of an exemplary environment where a user may want to employ an auxiliary display unit as well as a main display unit.

FIG. 1A is a block diagram of an exemplary multi-display computer system 100 in which a user 105 employs a main display unit 110 and an auxiliary display unit 150 both coupled to a desktop computer 120.

For sake of adding concreteness to the example, it is assumed that the user 105 is a financial analyst who has a spreadsheet program executing within computer 120. The main display unit 110 has a first display area 111 of finite size within which one or more tabs of a detailed spreadsheet 121 are displayed. Upon studying a particular section of the spreadsheet 121, the user 105 decides that he wants to see a pie chart (or other focused) interpretation 123 of results belonging to one particular subsection of the spreadsheet 121 displayed separately in a new window. Unfortunately the finite display 111 of the main monitor is insufficient to accommodate both the enlarged focused view 123 that the user 105 wants to see and the already displayed spreadsheet 121 whose view the user does not want to lose. By clicking his mouse (140) over an appropriate on-screen icon 122, the user 105 instructs the computer 120 to display the expanded pie chart view 123 in the display area 151 of the auxiliary display unit 150. This will allow the user 105 to simultaneously view the spreadsheet 121 and the expanded pie chart view 123.

In response to the user's commands, the computer 120 generates the desired graphics data for the auxiliary image 123 and transmits that image data through an auxiliary video port and along the port's cable 156 to the auxiliary display unit 150. The auxiliary display unit 150 responds to the received video data (156) by displaying the expanded pie chart view 123 in its display area 151. As a result, the user 105 can continue to study details of the spreadsheet 121 as displayed on the main display unit 110 while simultaneously studying the graphic auxiliary results 123 displayed on the auxiliary display unit 150.

A problem occurs however, if the user 105 wishes to keep the large spreadsheet 121 displayed on the main display unit 110 while simultaneously viewing yet more expanded views like 123 on yet further auxiliary monitors. Firstly, the number of video output ports on the conventional computer 120 is generally limited to no more than two. In the case where the computer 120 is a desktop unit, there will be a main video port plug into which the jack of main video cable 126 is plugged and just one auxiliary video port plug into which the jack of an auxiliary video cable 156 is plugged. A plug-and-play detection circuit detects the optional attachment of the auxiliary monitor 150 and automatically configures the computer internal software to interact with the auxiliary monitor 150 (e.g., by reserving DRAM memory area for the graphics that is to be displayed on the auxiliary monitor).

In an alternate case (not shown), the user's computer 120 and keyboard 130 and main display unit 110 are integral parts of a laptop computer. In such a case, the main video port 126 is generally not available for user access and is provided only internally within the laptop while only one auxiliary video connector 156 is provided for optionally attaching the auxiliary display unit 150. Therefore, because of limited connector space available on such a laptop computer or on even smaller computers, it is not practical to add additional parallel video ports for supporting additional display monitors. Moreover, the circuitry for supporting each additional video output port 126, 156 is relatively expensive. Therefore it is generally impractical to keep adding further video output ports if the user 105 will not always be using them. Some computer users (not 105) never or hardly ever use an auxiliary display unit 150. Accordingly for such less sophisticated users it is economically impractical to provide multiple video output ports that will never be used and will merely consume space and add unnecessary cost to the system.

Figure 1B:
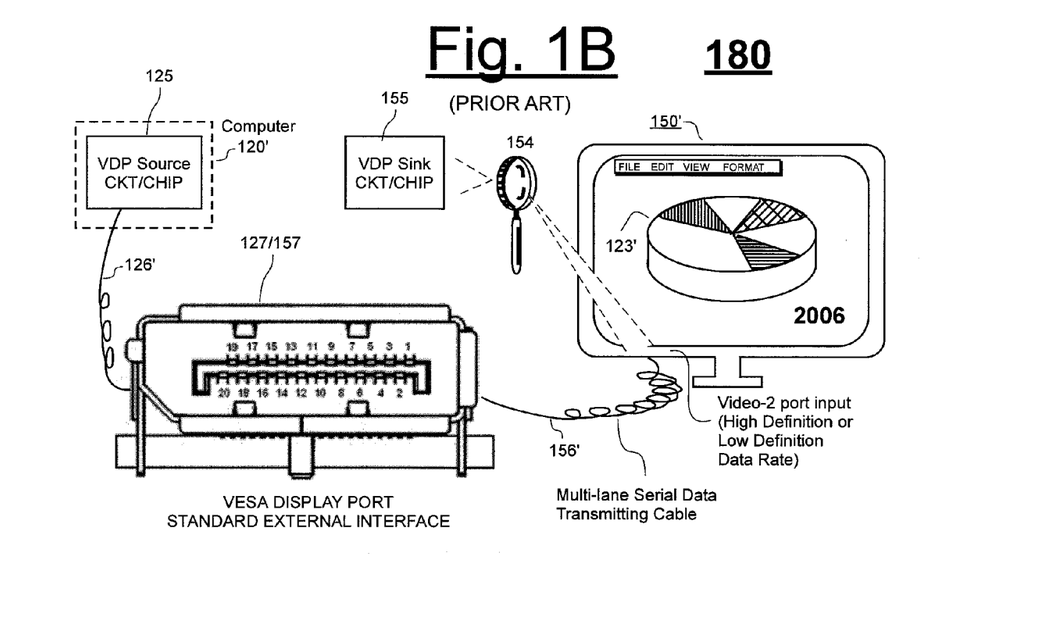
FIG. 1B is a schematic diagram showing an environment in which a VESA-DP serial transmission scheme is used for coupling a video signal to the auxiliary display unit of FIG. 1.

Referring to FIG. 1B, shown is a system 180 which employs a VESA Display Port interface. In accordance with the VESA protocol, the computer 120' includes a VESA Display Port source circuit or source chip 125 that couples to a VESA Display Port standard interface plug 127. A VESA-to-VESA connector cable (not explicitly shown) couples from the first VESA Display Port interface plug 127 to a second alike VESA Port interface plug 157 where the later interface plug 157 then connects (156') to a VESA-DP data sinking chip or circuit 155 provided within the auxiliary display unit 150'.

In accordance with the VESA DP protocol 1.1 the following pinouts are called for on the source-side VESA Display Port external interface plug 127:

TABLE 1

| Pin Number | Pin Name | Details |
| --- | --- | --- |
| Pin 1 | ML_Lane 0(p) | 'True' Signal for Lane 0 |
| Pin 2 | GND | Ground |
| Pin 3 | ML_Lane 0(n) | 'Complement' Signal for Lane 0 |
| Pin 4 | ML_Lane 1(p) | 'True' Signal for Lane 1 |
| Pin 5 | GND | Ground |
| Pin 6 | ML_Lane 1(n) | 'Complement' Signal for Lane 1 |
| Pin 7 | ML_Lane 2(p) | 'True' Signal for Lane 2 |
| Pin 8 | GND | Ground |
| Pin 9 | ML_Lane 2(n) | 'Complement' Signal for Lane 2 |
| Pin 10 | ML_Lane 3(p) | 'True' Signal for Lane 3 |
| Pin 11 | GND | Ground |
| Pin 12 | ML_Lane 3(n) | 'Complement' Signal for Lane 3 |
| Pin 13 | GND | Ground |
| Pin 14 | GND | Ground |
| Pin 15 | AUX_CH(p) | 'True' Signal for Auxiliary Channel |
| Pin 16 | GND | Ground |

TABLE 1-continued

| Pin Number | Pin Name | Details |
| --- | --- | --- |
| Pin 17 | AUX_CH(n) | 'Complement' Signal for Auxiliary Channel |
| Pin 18 | Hot Plug | Hot Plug Detect (HPD) |
| Pin 19 | DP_PWR Return | Power Return |
| Pin 20 | DP_PWR | Power Connector for connector cable |

It is to be noted that the above Table 1 shows the pinout for the source-side connector (127). The sink-side connector (157) pinout will have lanes 0-3 reversed in order, i.e. lane 3 will be on pins 1 and 3 while lane 0 will be on pins 10 and 12.

Figure 2:
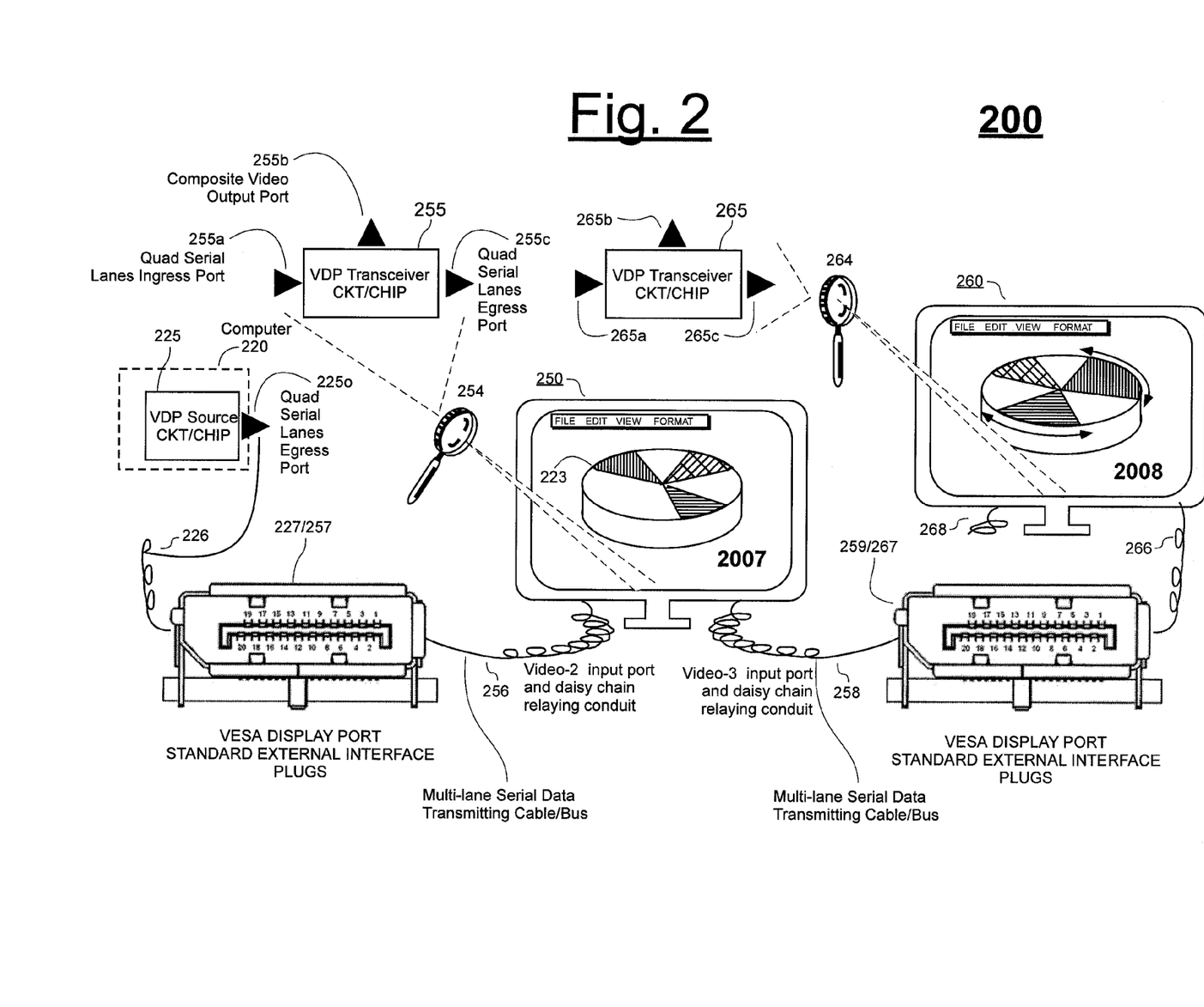
FIG. 2 is a block diagram showing a VESA-DP compatible display unit in accordance with the disclosure where the display unit comprises a VESA-DP compatible transceiver chip having a multi-lane serial input port, a daisy-chaining capable, multi-lane serial outputting and signal relaying port and a local display outputting port.

FIG. 2 is a block diagram of a video signal generating and display system 200 in accordance with the present disclosure of invention. Like reference symbols and numbers in the "200" century series are used for elements of FIG. 2 which correspond to but are not necessarily the same as the elements represented by similar symbols and reference numbers of the "100" series in FIG. 1B. As such, an introductory description of all elements found in FIG. 2 is omitted here and just the differences are described.

Unlike auxiliary monitor 150 of FIG. 1B which has just one video-sink connector 157 provided thereon, the auxiliary monitor 250 of FIG. 2 has two VESA-DP compatible connectors provided thereon: a video sinking and receiving connector 257 and a video outputting and relaying connector 259. Also provided within auxiliary monitor 250 (as indicated by magnifier symbol 254) and interposed between the VESA-DP compatible connectors 257 and 259 of monitor 250 is a first VESA-DP compatible transceiver circuit (or monolithic integrated circuit) 255. The VDP-compatible transceiver circuit/chip 255 is dynamically programmable to operate in a first mode as a conventional VESA-DP sink circuit (e.g., like 155 of FIG. 1B). However, the VDP-compatible transceiver circuit/chip 255 is dynamically programmable to instead operate in a second mode as a full or partial relay that relays to a second auxiliary monitor 260 (via the video outputting and relaying connector 259) all or part of a video data stream received by transceiver circuit/chip 255. Although not fully shown, it is to be understood that the first transceiver circuit/chip 255 operates as a three port data router having ports 255a, 255b and 255c. It receives a multi-lane VDP-compatible stream of input video data over a first port 255a thereof, it deserializes and selectively routes part or all of the received and deserialized video data over to a second port 255b thereof (for example as composite RGB video signals) for display on the associated monitor 250, and it selectively reserializes and relays forward part or all of the received video data over a third port 255c thereof to a corresponding first VDP-compatible receiving port 265a of a next in-chain VDP-compatible transceiver circuit/chip 265, where the latter is structured similar to 255 although the next-in-chain transceiver circuit/chip 265 may be programmed differently. It is understood of course, that the next-in-chain transceiver circuit/chip 265 may be further coupled to yet a next-in-chain transceiver circuit/chip (not shown) via connection 268 and so on. In one embodiment, the last in line receiving chip can be a conventional VESA-DP sink circuit (e.g., like 155 of FIG. 1B).

Also, it is to be understood with regard to FIG. 2 that the illustrated configuration wherein each three-port VDP-compatible transceiver circuit/chip 255, 265 (whose placement is indicated by magnifier symbol 264), etc., is mounted inside its respective display unit 250, 260, etc., is not a necessary condition of the present disclosure. Each three-port VDP-compatible transceiver circuit/chip 255, 265, etc. may instead be mounted elsewhere, for example inside of a three connector junction box (not shown) where at least two of the three connectors are respectively a VESA-DP compatible video sinking and receiving connector (like 257) and a VESA-DP compatible video outputting and relaying connector (like 259). The third connector on the junction box (not shown) may be one that is compatible with the associated local monitor (250) and may or may not be a VESA-DP compatible video outputting connector. For example the third connector on the junction box (not shown) may be an RGB video composite outputting connector.

Moreover, it is to be understood with regard to FIG. 2 that the illustrated buses and/or cables 226, 256, 258, 266, 268 may not appear exactly as shown. The schematic representation is provided as such mostly as a short hand for avoiding the necessity of showing in detail all five VESA-DP connectors that would appear if the schematic was drawn in a less abbreviated form. It is to be understood that there is at least one VESA-DP source connector 227 on computer 220; there is at least one VESA-DP sink-and-relay connector 257 and at least one VESA-DP source-and-relay connector 259 on first monitor unit 250; and there is at least one VESA-DP sink-and-relay connector 267 and at least one VESA-DP source-and-relay connector (represented by 268) on second monitor unit 260. Accordingly, there is one VESA-DP compatible cable 226-256 between connectors 227 and 257. There is a second VESA-DP compatible cable 258-266 between connectors 259 and 267. There is a third VESA-DP compatible cable 268 which may optionally extend from second monitor 260 to a further signal receiving and/or relaying device in the daisy chain. Each source-and-relay connector like 259 and 268 supports hot-plug detection (HPD) so that the daisy chain may be extended or shortened on the fly as deemed appropriate by users.

Figure 3A:
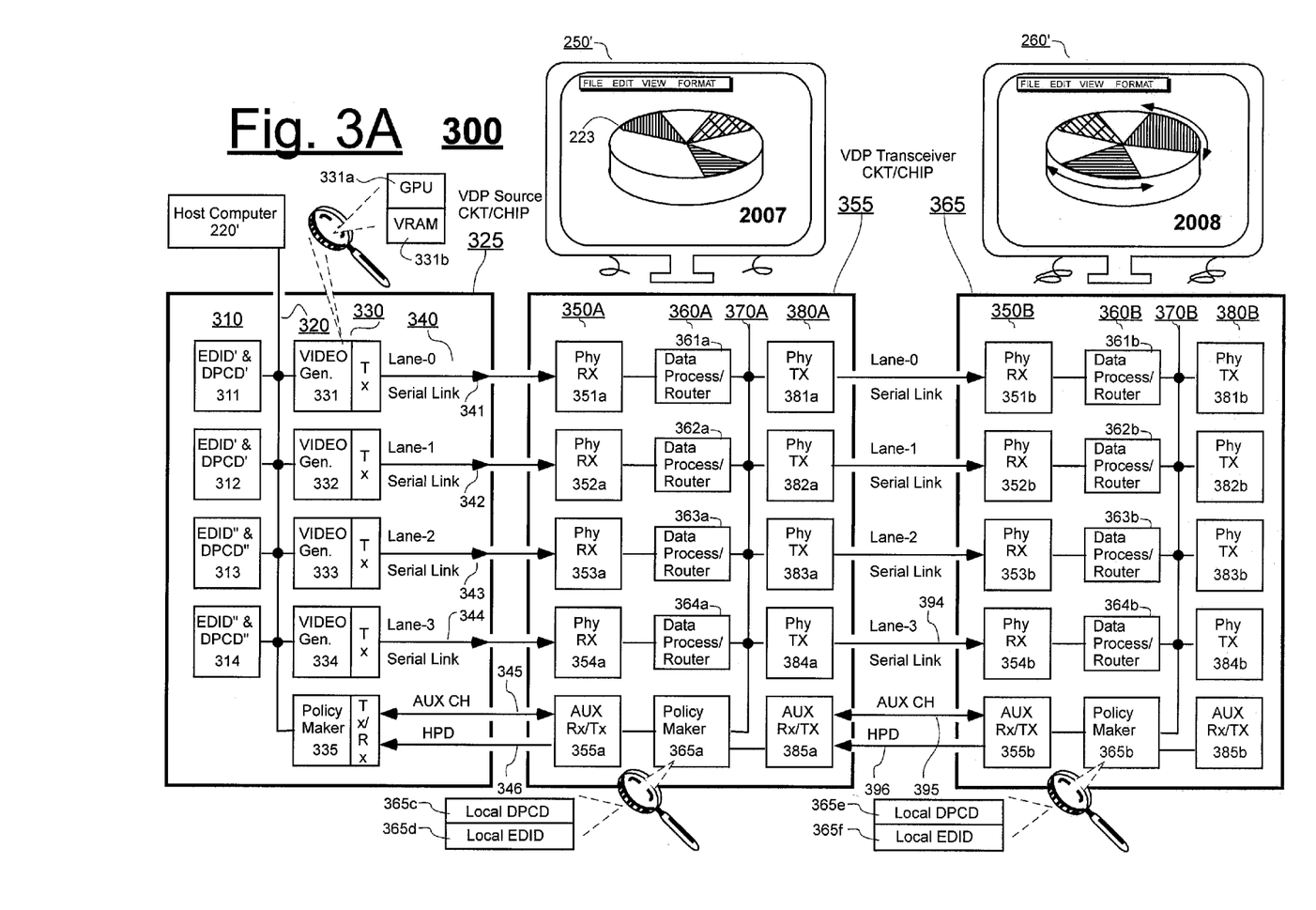
FIG. 3A is a schematic diagram showing a combination of a VESA-DP compatible source chip and a plurality of daisy-chain capable, VESA-DP compatible transceiver chips.

FIG. 3A provides a more detailed look at a system 300 in accordance with the disclosure. The system 300 includes a VESA-DP compatible video outputting circuit/chip 325 (a source device) and two VESA-DP compatible video transceiving circuits/chips 355 and 365 (sink devices) connected in daisy-chain fashion as shown. Each VDP-compatible transceiving circuit/chip (355 or 365) has four independent serial video data receiving units (351a-354a or 351b-354b) within it and one auxiliary control data transceiving unit (355a or 355b) within it. The four serial video data receiving units 351a-354a (or 351b-354b) each receives serialized lane data over a respective one of serial links 341-344 (or 391-394) and deserializes the received lane data (e.g., recovers clock and data from it) for purpose of forwarding it to a respective data processor and router unit 361a-364a (or 361b-364b) within the respective transceiving circuit/chip (355 or 365). Each data processor and router unit (e.g., 361a-364a) is programmable to, among other things, automatically route its received data generally horizontally to the next adjacent, physical transmitter unit (e.g., 381a-384a) or alternatively along interconnect bus 370A (or 370B) to a different physical transmitter unit (e.g., 381a-384a). See routers 363a and 364a of FIG. 3B.

Each data processor and router unit (e.g., 361a-364a) is further programmable to, among other things, route its received and processed data generally vertically along the adjacent interconnect bus 370A (or 370B) to the associated local display monitor 250' or 260'. See processors 361a and 362a of FIG. 3B. When routing to an associated local display monitor, the processor and router unit (e.g., 361a-364a) may combine and/or intermix data from plural lanes (pre-aligned lanes) so as to form a composite video signal for output along vertical bus 370A (or 370B) to the local output port (255b or 265b of FIG. 2) and therefrom to the local display monitor.

When deserialized data is routed by one of the processor and router units (e.g., 361a-364a) to a corresponding physical transmitter unit (e.g., 381a-384a), the physical transmitter unit reserializes its received data and outputs it along the next serial data link (e.g., 391-394) for receipt by a next-in-chain serial video data receiving unit (e.g., 351b-354b).

The auxiliary control data transceiving units (355a or 355b) of transceiving circuits/chips 355 and 365 each couples to a respective, sink-side policy-maker unit (365a or 365b) in the chip, where the latter operatively couples to the data processor and router units (360A or 360B) via the local vertical bus (370A or 370B) of the chip.

Each of the VDP-compatible chips includes a set of Display Port Configuration Data (DPCD) registers and EDID (Extended Display Identification Data) registers. More specifically, the local Display Port Configuration Data of a local monitor, say of monitor 250', is stored into the local (sink-side) DPCD registers 365c and local EDID registers 365d inside the policy maker 365a of the corresponding VESA-DP compatible video transceiving circuit/chip (e.g., 355). This local programming is the responsibility of the manufacturer of the local monitor (e.g., 250'). As understood by artisans skilled in the VESA-DP art, the VESA-compliant EDI data indicates physical attributes of the local monitor such as manufacturer, make and model as well as allowed ranges for reconfigurable features (e.g., current screen resolution) and default values for each. The VESA-compliant DPC data indicates the current reconfigurable configuration of the monitor. Similarly, the policy maker 365b of the second VESA-DP compatible video transceiving circuit/chip and 365 includes its own locally programmed set of local DPCD registers 365e and local EDID registers 365f programmed with the information corresponding to local monitor 260'.

During system reboot or reset, the local DPC data (e.g., 365c, 365e) and EDI data (e.g., 365d, 365f) is copied from the local policy makers (e.g., 365a and 365b) into copy-holding ones of source EDID registers and source EDID registers in the respective and independently programmable DPCD and EDID units 311-314 of source circuit/chip 325. The copied EDI data and copied DPC data are denoted with apostrophied suffixes, for example DPCD' and EDID' for units 311-312 and DPCD" and EDID" for units 313-314. This indicates in the exemplary embodiment 300 that the local DPCD and EDID (365c, 365d) of policy maker 365a were copied into units 311-312 while the local DPCD and EDID (365e, 365f) of policy maker 365b were copied into units 313-314; where the reason for this is because local monitor 250' will use the combined bandwidths of serial links 341-342 to support its current configuration and because the second local monitor 260' will use the combined bandwidths of serial links 343-344 to support its current configuration.

The source-side DPCD & EDID storing units 311-314 respectively couple to video stream generators and serial transmitter units 331-334. In one embodiment, each of the video stream generators and serial transmitter units 331-334 includes a video SRAM block (e.g., 331b) for storing video data that is to be serially transmitted out along the respective serial link (e.g., 341). Each of the video stream generators and serial transmitter units 331-334 further includes a graphics data processing unit (GPU, e.g., 331a) for processing the VRAM held data in accordance with configuration data held in the corresponding source-side, DPCD & EDID storing unit (e.g., 311). The source-side, DPCD & EDID storing unit may further store machine instructions for causing the GPU (e.g., 331a) to execute desired ones of predefined programs. Alternatively or additionally, the GPU software may be stored in a shared memory space (not shown) of the VDP source circuit 325. The host computer 220' downloads video data that is to be displayed by one or more of the active monitors (e.g., 250', 260') into the respective VRAMS (e.g., 331b) of unit 331-334. The internal GPU's (e.g., 331a) then further process the downloaded video data in accordance with current configuration information provided in the associated DPCD & EDID storing unit (e.g., 311) so that the data is compatible with the specific protocols of the destination monitor (e.g., 250' or 260'). Each of the active video stream generator and serial transmitter units 331-334 then serializes its respective video data and transmits it out along its respective output link 341-344. It is within the contemplation of the disclosure that not all of units 331-334 need be active and consuming power at all times. For example, if each of the active target monitors (e.g., 250', 260') along the daisy chain needs only one lane of bandwidth to support its current resolution setting, then units 333 and 334 may be powered down to save energy. Similarly units 353a-363a-383a and 354a-364a-384a in sink-side circuit 355 will be programmably powered down and units 352b-362b-382b, 353b-363b-383b and 354b-364b-384b in sink-side circuit 365 will be programmably powered down to save energy. Then when one or more of the active monitors is to be switched to a higher level of resolution that calls for greater bandwidth, additional ones of the powered-down units inside chips 325, 355, 365 are powered up and re-configured to match the desired amounts of bandwidth and desired routing of video signals to destination monitors.

Although the example of FIG. 3A shows four lanes of serially linked video data for each of chips 325, 355 and 365 so as to match the current VESA-DP protocol, it is within the contemplation of the disclosure to alter this number and provide a fewer number of video streaming lanes (e.g., just three) or a greater number of video streaming lanes (e.g., 6, 8, 10, etc.) in each of chips 325, 355 and 365 as may be deemed appropriate by system designers. For example, source chip 325 might be designed to contain eight (8) video stream generators and serial transmitter units similar to 331-334 so as to thereby integrally support two VESA Display Ports of 4 lanes each (or to integrally support an 8-lane port protocol) while the sink side transceiver chips 355-365 may continue to contain only enough circuitry for supporting 4 lanes each, although with destination addressing means for distinguishing amongst a larger number of sink side lanes. In such a case, the source chip will drive two daisy chains of 4 lanes each. (The meaning of destination addressing means will be become clearer below. See for example the destination ID field 452 of FIG. 4.) Moreover, even though FIG. 3A shows each video stream generator and serial transmitter unit (e.g., 331) as containing its own dedicated GPU (e.g., 331a) and its own dedicated VRAM (e.g., 331b), it is within the contemplation of the disclosure to share video data processing resources and/or video data storage resources amongst the plural video stream generators and serial transmitter units (e.g., 331-334) of the source-side chip or to similarly share video data processing resources and/or video data storage resources amongst the plural video stream relaying means of the sink-side transceiver units 355 and 365. The video data processing resources may be ones other than general purpose GPU's (e.g., ASIC style video processor circuits) and the video data storage resources may be ones other than SRAM style video memory (e.g., video speed DRAM memory).

During system reboot or reset or re-configuration, the presence of the more downstream, second local monitor 260' and its VDP Transceiver chip 365 within the daisy chain is signaled by hot plug detection line 396 to policy maker 365a in the first VDP Transceiver chip 355. In accordance with VDP protocol, HPD line toggles low for a predetermined time (e.g., 2 ms or greater) and then generally back high so as to signal any one of three events, namely, a hot plug-in event, a hot un-plug event, and an interrupt request (IRQ) by a sink device. During boot-up, the first VDP Transceiver chip 355 signals its presence on the daisy chain by toggling HPD line 346. The second VDP Transceiver chip 365 similarly signals its presence on the daisy chain by toggling HPD line 396. In response, the first VDP Transceiver chip 355 automatically relays the signal upstream to the source policy maker 335 in the VDP source chip 325 by again toggling the HPD line 346. As the hot-plug terminology implies, each additional VDP Transceiver chip (e.g., a third one after 365) may be hot-plug connected to the downstream end of the daisy chain or unplugged from the daisy chain and its added presence as a powered up and active member of the daisy chain or as an unplugged device may be signaled to the source chip 325 by relaying the respective local toggling of the local hot plug detection line (HPD) through the next upstream one in the chain of VDP Transceiver chips until the toggle signal reaches HPD input line 346 on the source device 325. Then, in response to such togglings of the HPD input line 346, the source device 325 sends status inquiry packets (see 450 of FIG. 4) over the auxiliary channel line (AUX CH) 345 for relaying to the addressed one (see Destination field 452 of FIG. 4) of the downstream VDP Transceiver chips. If a new VDP Transceiver chip has been added on to the daisy chain by way of hot plugging, it will respond to the status inquiry by returning its local DPCD (e.g., 365e) and local EDID (e.g., 365f data in the response packet (see 460 of FIG. 4) that is relayed upstream over the auxiliary channel lines until the information arrives in the source policy maker 335. The illustrated source chip 325 can have a maximum of four VDP Transceiver chips coupled to it in daisy chain connection style with each of the four VDP Transceiver chips (not shown) consuming a respective one serial link lane for receiving its respective video data from the source chip 325. In the illustrated example 300' of FIG. 3B there are only two VDP Transceiver chips activated and coupled in daisy chain connection style to the source chip 325. The first VDP Transceiver chip 355' consumes source serial link lanes 0 and 1 (341 and 342) while the second VDP Transceiver chip 365' consumes source serial link lanes 2 and 3 (lines 343 and 344). The second VDP Transceiver chip 365' of FIG. 3B could alternatively have been a conventional VDP sink chip that expects to receive its video input stream over serial links 391 and 392. The first VDP Transceiver chip 355' is configured to route the video stream data of source serial link lanes 2 and 3 (lines 343 and 344) over to serial links 391 and 392 (lane remapping) in a manner that is transparent to the next downstream chip 365'. As a result, the most downstream of the VDP Transceiver chips can be replaced with a conventional VDP sink chip if so desired.

In order to support the above described copying and relaying of DPC data and EDI data, certain supplemental changes should be made to the standard VESA Display Port specification as set forth below.

2.1 Supplemental Display Port Configuration Data (DPCD) Registers

The VESA-DP 1.1 specification defines the functionality of certain control register addresses while leaving others as unused and reserved for future expansion. Among the reserved register space addresses are addresses 00300(hex)-00303(h) and 00400(hex)-00404(h) which the present disclosure proposes to adapt for supporting the video data daisy chaining operations described herein. Accordingly, In one embodiment, in order to support the optional daisy chain enabling features, the following new DPCD register definitions are used in the source specific DPCD fields (311-314) of the modified source device (325) as well as in the sink-side specific DPCD fields (365c, 365e) of the transceiver units (355, 365).

TABLE 2

Added DPCD Source-Specific Fields
Source Specific Fields

| | | |
|---|---|---|
| 00300h | OUI 7:0 (First 8 bits of Organized Unit Identification) | Read/Write |
| 00301h | OUI 15:8 | Read/Write |
| 00302h | OUI 23:16 | Read/Write |
| 00303h | DAISY_CHAIN_SUPPORT_0<br>Bit 0 = DAISY_CHAIN_SUPPORT<br>    0 = Don't support extended AUX_CH syntax<br>    1 = Support extended AUX_CH syntax to<br>        daisy chain<br>Bits 7:1 = RESERVED. Read all 0's. | Read/Write |

TABLE 3

Added DPCD Sink Specific fields
Source Specific Fields

| | | |
|---|---|---|
| 00400h | OUI 7:0 (First 8 bits of Organized Unit Identification for VDP transceiver unit) | Read/Write |
| 00401h | OUI 15:8 | Read/Write |
| 00402h | OUI 23:16 | Read/Write |
| 00403h | DAISY_CHAIN_SUPPORT_0<br>Bit 0 = DAISY_CHAIN_SUPPORT<br>    0 = Don't support extended AUX_CH syntax<br>    1 = Support extended AUX_CH syntax to<br>        daisy chain<br>Bits 3:1 = RESERVED. Read all 0's.<br>Bits 5:4 = This SINK_DEVICE_ID<br>    00 = sink id 0<br>    01 = sink id 1 | Read/Write |

TABLE 3-continued

Added DPCD Sink Specific fields
Source Specific Fields

|  |  |  |
|---|---|---|
| | 10 = sink id 2 | |
| | 11 = sink id 3 | |
| | Bits 7:6 = RESERVED. Read all 0's. | |
| 00404h | DAISY_CHAIN_SUPPORT_1 | Read/Write |
| | Bits 3:0 = IN_ACTIVE_LANES | |
| | Each bit corresponds to a respective lane ID. | |
| | For example, 0011h means lane0 and 1 are | |
| | active to receive incoming video. | |
| | Bits 7:4 = OUT_ACTIVE_LANES | |
| | Each bit corresponds to respective lane ID for | |
| | video data being relayed further downstream. | |
| | For example, 0011h means lane0 and 1 are | |
| | active. | |

Additional Explanations
DAISY_CHAIN_SUPPORT: Bit 0 of DPCD 00303h and 00403h
This user-programmable field indicates whether the given source or sink device's daisy chain supporting capability is turned on or off. When this field of a source specific field is set to logic '1', the corresponding source device (e.g., 325) is switched into a mode capable of supporting up to 4 independent Display Port video data streams heading downstream out of the source unit (e.g., 325) with each stream or lane (341-344) including video and secondary data that can be distributed to downstream sink devices in daisy chain fashion. Also the source device (e.g., 325) is switched in this mode to support extended AUX_CH transactions such as ones described in below section 2.2.

When the Bit 0 of DPCD address 00403h is set to logic '1' in a sink-side device, the sink device is switched into a mode that supports the sink-circuit portion of the extended AUX_CH transaction described below.

SINK_DEVICE_ID: Bits 5:4 of DPCD location 00403h
Auxiliary channel messages are sent as packets with destination indicators when the daisy chain supporting mode is turned on. See for example FIG. 4 where the structure of a packet output by the source unit 425 is shown at 450 and the structure of a response packet output by the responding sink device is shown at 460. Bits 5:4 of DPCD location 00403h in the sink-side device (e.g., 455, 465 or 475) define the sink device identification within the given daisy chain. In the case where there is a maximum of four unique sink-side devices allowed in the chain, the id value is in range of 0 to 3 inclusive. This sink device ID field is used by the sink-side device to determine if it should respond to a transaction request packet 450 issued by a source device (e.g., 425) over the AUX_CH channel 445. When upon detecting a match of ID values, a sink device does respond, it copies the sink device ID value stored in location 00403h of its local DPCD registers into the ID field 462 of the response packet 460. The response packet 460 is relayed back to the request-issuing source device (e.g., 425) over the AUX_CH channel 445 by way of whatever number of intervening transceiver devices (e.g., 455, 465, 475) are present on the daisy chain.

Figure 4:
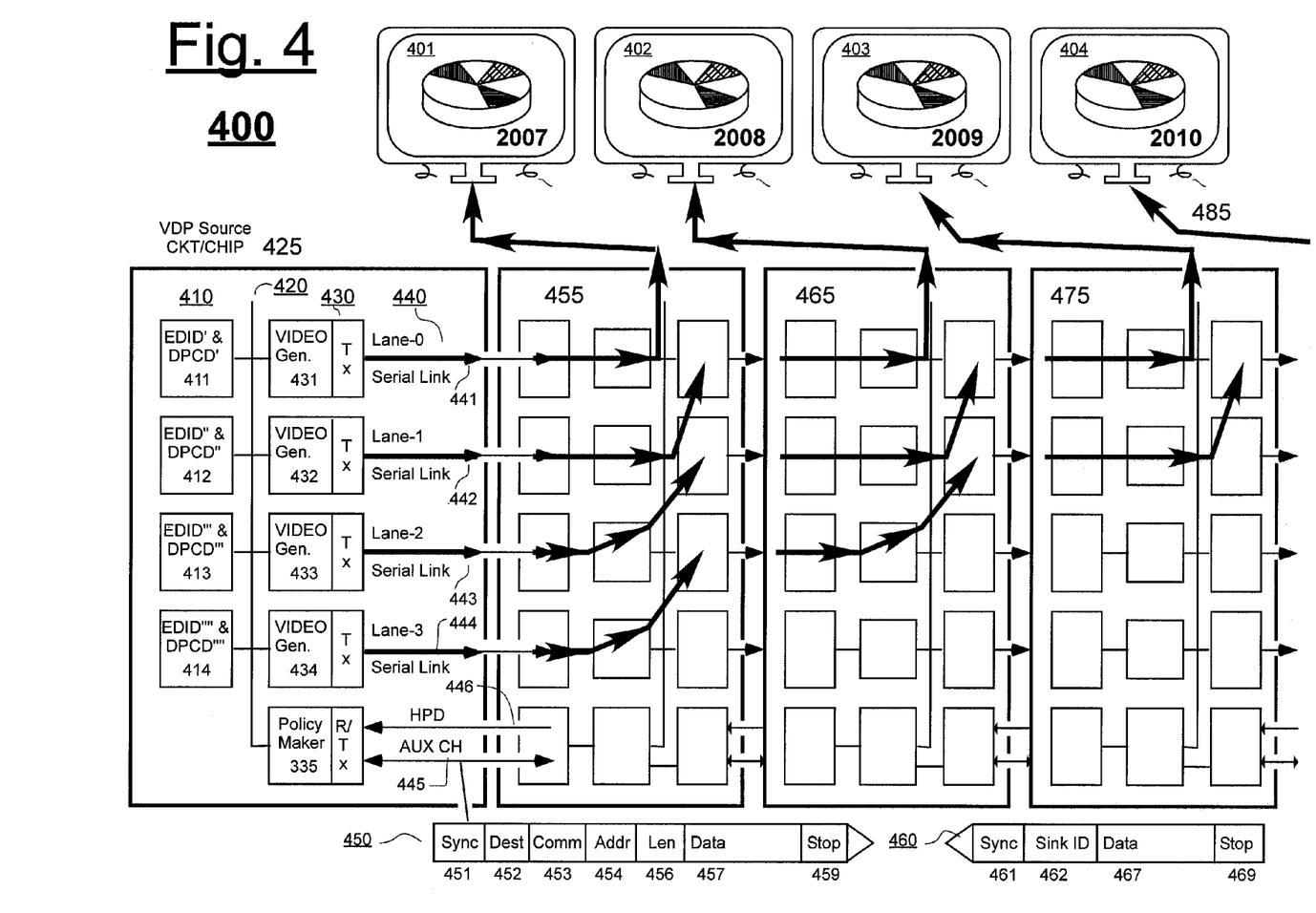

IN_ACTIVE_LANES and OUT_ACTIVE_LANES: The data stored in DPCD location 00404h of each sink-side device (e.g., 455, 465 or 475) defines which of the ingress lanes and which of the egress lanes of its sink-side device are active. In one embodiment, ingress-to-egress lane mapping is defined on the basis of the number of active ingress lanes and active egress lanes. Below section 5 explains how one embodiment of such a lane mapping algorithm works. By way of example, in FIG. 4, sink device 465(B) may be programmed to indicate that the first three of its ingress lanes are active and just two the first two of its egress lanes are active. As a result, the video streams are routed (remapped) through device 465(b) as shown in FIG. 4.

2.2 Extended AUX_CH Request/Response Transaction Syntax:
Still referring to FIG. 4, since a source device (425) can send up to 4 different video streams to the sink devices in the daisy chain, as is illustrated in FIG. 4, the standard VESA-DP AUX_CH handshaking protocol is modified to include a destination identifying byte 452 in output transaction requests 450 when the supplemental extended mode is active. In one embodiment, the two least significant bits of destination byte 452 identify the targeted sink device which is to respond to the transaction request packet 450 while the remaining six bits are reserved for future expansion and set to '0'. The rest of the transaction request signal remains the same as in standard VESA-DP AUX_CH handshaking. Byte 451 is the transmission synchronization field and is used for clock recovery as well as signaling the start of the transaction request signal. In one embodiment, each transceiver device (455, 465, 475) is assigned a unique synchronization symbol but only the synchronization symbol (451) used on lane 0 (441) is used for generating a reference clock signal to which the all the transceiver devices (e.g., 455, 465, 475, etc.) will synchronize their local clocks to. The reference clock signal is then used for time wise aligning video signals on packed together ones of plural video lanes.

Byte 453 of the extended transaction signal 450 contains a coded command in least significant bits 3:0 thereof and target address bits 19:16 in the upper half of the byte. Field 454 is 2 bytes long and contains respective target address bits 15:8 and 0:7 in its upper and lower halves. Bits 7:0 of the Length byte 456 specify payload length. The payload data is held in field 457 and the end of packet or stop byte occurs at 459.

In the corresponding response packet 460 from the responding sink-device, a one byte, Sink_ID field 462 is added after the lane-specific synchronization byte 461. In one embodiment, the two least significant bits of sink_ID byte 462 identify the responding sink device which produced transaction response packet 460 while the remaining six bits are reserved for future expansion and set to '0'.

3.0 Source device requirements: In order to support the daisy chain expansion features, a source device (e.g., 425) in accordance with the disclosure should be designed to support below the following aspects: (1) Comport with the new DPCD source specific fields (as defined in above Section 2.1); (2) support the Extended AUX_CH syntax (as described above) as well as the original native VESA-DP AUX_CH syntax; (3) Support at least 4 independent source stream generators (431-434); (4) Be able to copy into itself or otherwise responsively manage up to 4 local EDID and DPCD register sets (see 365*c*, 365*d* of FIG. 3A) for the corresponding 4 sink devices; and (5) include a Programmable timer for handling the extended AUX_CH transactions as described below.

4.0 Sink device requirements: To support daisy chain features described herein, in one embodiment, each sink device (e.g., 455(A)) should be able to support the following enumerated aspects: (1) Be capable of setting a sink device id either in response to manually established specifications (e.g., a rotary or panel button on the local monitor) or automatically (e.g., in response to pre-loaded EDID data); (2) Comport with the new DPCD sink specific fields (as defined in above Section 2.1); (2) Support the Extended AUX_CH syntax (as described above) as well as the original native VESA-DP AUX_CH syntax; (3) Support pass through of at least 4 independent video streams if asked to function as a pass-through device and/or support rerouting (remapping) of passed-through video streams to alternate egress lanes when relaying the streams that are destined for a next sink device along the daisy chain; (4) Provide an extended and native AUX_CH transaction generator/processor (policy maker) for interacting with the next downstream sink device along the daisy chain; (5) Relay HPD toggle signals generated from downstream sink device to up-stream sink devices or to the upstream source device (425).

5.0 Transaction Details 5.1 AUX_CH Transactions

Once the DAISY_CHAIN_SUPPORT field is set, the source device (e.g., 425) will use the Extended AUX_CH syntax including DEST_ID field to generate transactions in place of the standard native VESA-DP AUX_CH syntax. In one embodiment, the following process is employed:

Step 1: The source device (e.g., 425) generates and outputs an AUX_CH write/read request transaction using DEST_ID=1 from its AUX_CH line (e.g., 445) and starts an internal response time-out timer whose time-out value is greater than that used by the timer for native AUX_CH exchanges (this being because it can take more time to relay the transaction request signal 460 downstream to the targeted transceiver device (e.g., 485) and more time to relay the response upstream through intervening ones of the transceiver devices).

Step 2: The first sink device along the daisy chain (e.g., 455 whose Sink ID is 0) receives this transaction request packet (450) and checks the DEST_ID field (452) to see if the packet is destined for the present sink device or destined for others. If DEST_ID is different from its id, the present sink device (e.g., 455) relays the request downstream by generating and outputting a new AUX_CH write/read transaction request packet and starts its internal time-out timer.

Step 3: The next sink device along the daisy chain (e.g., 465 whose Sink ID is 1) receives the transaction request packet output by the more upstream sink device (455) and checks to see if the DEST_ID field 452 in this second transaction request packet matches its id. If it matches its id, the next sink device (e.g., 465) performs the commanded write or read of its corresponding local DPCD register and sends the AUX_CH response transaction packet 460 back upstream along the AUX CH chain with the Sink_ID. field 462 set equal to the DEST_ID of the responding sink device (e.g., 465).

Step 4: The next upstream sink device (e.g., 455) receives the response transaction packet from the responding sink device (e.g., 465) and repeats Step 3 while at the same time stopping its internal timeout timer. Then the upstream sink device (e.g., 455—having sink ID 0) forwards the response transaction to the source device 425 while similarly stopping its internal timeout timer.

Step 5: The source device (425) receives the relayed response transaction packet 460 and responsively stops its internal timeout timer. The source device may then relay the received data 467 to an appropriate memory area (e.g., 411-414) for use by its internal GPU's 431-434 and/or for upload to the host computer (e.g., 220' of FIG. 3A).

5.2 Hot Plug Detection 5.2.1 Single source device and single sink device: In this case, the HDP detection process is the same as the native VESA-DP HPD process where the HDP line toggle is detected directly on HDP line 446 of FIG. 4 for example.

5.2.2 Single source device and two sink devices: In this case, the following HDP toggle relaying process is carried out:

Step 0: The SINK_DEVICE_IDs of the two in-chain sink devices should be set either manually through a panel button or automatically through EDID to different values. The DAISY_CHAIN_SUPPORT field, also, should be set to '1'.

Step 1: Upon a hot plug true event being detected for a first time after boot up at the source device due to an HDP line toggle, the source device (425) assumes the HDP toggle originated from the most upstream sink device (e.g., sink 0) even if it did not, and the source device (425) responsively reads sink 0's receiver capability fields (DPCD 00000h thru 0000Bh), its sink/link status field (DPCD 00200h thru 00205h) and its sink specific field (DPCD 00400h thru 00404h) using the native AUX_CH transaction syntax.

Step 2: When a true DAISY_CHAIN_SUPPORT bit (bit 4 of DPCD 00403h) is detected downstream by the source device (425), the source device sets bit 4 of source specific field (DPCD 00303h) to '1' using the native AUX_CH transaction process. Then both the source device and sink device enable their respective extended AUX_CH transaction functions. After this point all AUX_CH transactions are done using the Extended AUX_CH transaction syntax that includes the DEST_ID field 452 in transaction request signals 450.

Step 3: The source device reads the newly-added (hot plugged in) sink device's EDID data using an I2C-over-ext AUX_CH transaction that also includes use of the DEST_ID field 452 in the transaction request signal.

Step 4: The source device initiates link training for each of the hot plug detected new sink devices (currently just 455, but later it will include 465 and on). This link training will include alignment of packed together lanes and error rate clearing. For purpose of lane alignment, each transceiver device includes variable signal delay means (not explicitly shown) for fine tuning the delay associated with each video lane so that timing skew between lanes that carry video information of a same local monitor is minimized even if the cables of the respective lanes are of different lengths. Packed together lanes are those lanes that carry video stream data of one video frame, where timing skew may lead to noticeable distortion on the video monitor if the timing skew is not reduced to within acceptable tolerances.

Step 5: Once lane alignment is completed for all active lanes, the source device (425) activates the aligned lanes as constituting part of its active main links to the hot plug detected sink devices found thus far in the daisy chain. In accordance with the standard VDP protocol, the number of lanes that define the active main links can be 1, 2 or 4 but not 3. However, the present disclosure need not be limited to this standard and it is within the contemplation of the disclosure that any appropriate number of active lanes can be included as the active lanes in the current main links set of a given source device.

Step 6: When a current, more upstream daisy chain device (e.g., sink 0) detects a hot plug event from the next downstream device (e.g., sink 1) during implementation of normal native mode between the source and first in chain sink device (sink 0), the sink 0 device repeats above Steps 1 and 2 as if it were the source device so as to thereby enable extended AUX_CH connection between it (the sink 0 device) and the next downstream sink device (sink 1).

Step 7: After step 6, the Sink 0 device generates an additional hot plug event (the HDP line transitions to 0 for 2 ms or more and then back to 1 again) to the source device on HDP line 446.

Step 8: In response to step 7, the source device repeats above Step 1. If the sink/link status fields are all okay, such as indicating that the lanes have been successfully aligned, the source device 425 issues an extended AUX_CH transaction request 450 with DEST_ID=1 and repeats Step 2 for the sink 1 device.

Step 9: If sink 1's (465) sink/link status fields are not okay, the source device 425 repeats Step 4 in an attempt to re-initialize its main links (active serial links) to extend to the newly-added sink 1 device (465).

Step 10: Once lane alignment is done, the source device activates main links between the source device and the sink 1 device where these activated main links pass through and are remapped by the sink device 0 (see for example the remapping of links 343-344 to 391-392 in device 355' of FIG. 3B).

5.2.3 Single source device and more than two sink devices: In the case of a single source device (425) and more than two on-chain sink devices (e.g., 455, 465, 475 of FIG. 4), the following HDP relaying process is carried out:

Step 0: SINK_DEVICE_IDs of all sink devices should be set either manually through a panel button or automatically through EDID processing. DAISY_CHAIN_SUPPORT field, also, should be set to '1'.

Step 1: The source device carries out repeats Steps 1 thru 5 in above Section 5.1.2 until all main links between sink devices are aligned and activated.

Step 2: If a hot unplug event is detected in the source device (425) by virtue of an HDP toggle being relayed to the source device (425) and the source discovering that one or more of the previously in-chain devices are no longer in-chain because their local DPCD and EDID registers (e.g., 365e, 365f) cannot be read, the source repeats Step 1 until all remaining down-stream main links are realigned and activated. For example, if sink 1 is unplugged and re-plugged, all main links between a source and sink 1, 2, 3 will be broken. The source device repeats Step 1 until all main links between all downstream sink devices are activated. Accordingly, a hot unplug and replug may occur anywhere along the daisy chain rather than only at its most downstream end.

5.3 Main Links

In accordance with the standard VDP protocol the activated main links set of a given source device can be configured as the top 1, 2 or 4 lanes depending on the number of sink devices in daisy chain. However, as indicated above, the present disclosure is not limited to this standard and thus in other environments the activated main links set of a given source device can be configured to other numeric and spatial configurations of active and aligned links as may be appropriate in a given application.

Below Table 4 shows all the main link combinations that can be achieved for the standard VDP protocol.

TABLE 4

| | Combinations of active lane count in daisy chain | | | | |
|---|---|---|---|---|---|
| Case | # of active lanes coupling to the local monitor in device: Sink 0 | # of active lanes coupling to the local monitor in device: Sink 1 | # of active lanes coupling to the local monitor in device: Sink 2 | # of active lanes coupling to the local monitor in device: Sink 3 | Total # of plugged-in sink devices in daisy chain |
| 1 | 1 | 1 | 1 | 1 | 4 |
| 2 | 1 | 1 | 2 | n/a | 3 |
| 3 | 1 | 2 | 1 | n/a | 3 |
| 4 | 2 | 2 | n/a | n/a | 2 |
| 5 | 4 | n/a | n/a | n/a | 1 |

Thus it may be seen from above Table 4 that for the case (number 5) of just one sink device plugged in on the daisy chain, the band width of all four lanes is automatically made available to the local monitor (e.g., 401) for providing the high definition video display if desired. On the other hand, for the case (number 1) of four monitors being simultaneously plugged in on the daisy chain, the band width of the four available lanes is automatically distributed so that each monitor can provide at least the video display resolution associated with one lane if desired.

Referring to FIG. 3A, it is to be understood that in addition to signal de-serializers provided in its respective Phy Rx units (e.g., 351a-354a), each transceiving-capable sink device has up to 4 video signal serializers provided in its respective Phy Tx units (e.g., 381a-384a) for relaying main link video data that has as its destination a more downstream next sink device. Each transceiving-capable sink device (e.g., 355, 365) further has two additional pairs of auxiliary channel de-serializers and serializers for bidirectionally relaying serial AUX CH data to a more downstream or more upstream transceiving-capable sink device or to the most upstream source device (325). Each active sink device connects its locally active number of input lane(s) (per above Table 4) to its internal local bus (e.g., 370A, 370B) and from there to is respective local monitor (e.g., 250', 260'). The data processing units (e.g., 361a, 362a) of the locally active lanes coordinate with one another in accordance with commands sent from the local policy maker (e.g., 365a) to determine when if at all the video data received by the corresponding Phy Rx unit (e.g., 351a, 352a) is to be coupled to the local monitor via the common routing bus (e.g., 370A).

Figure 3B:
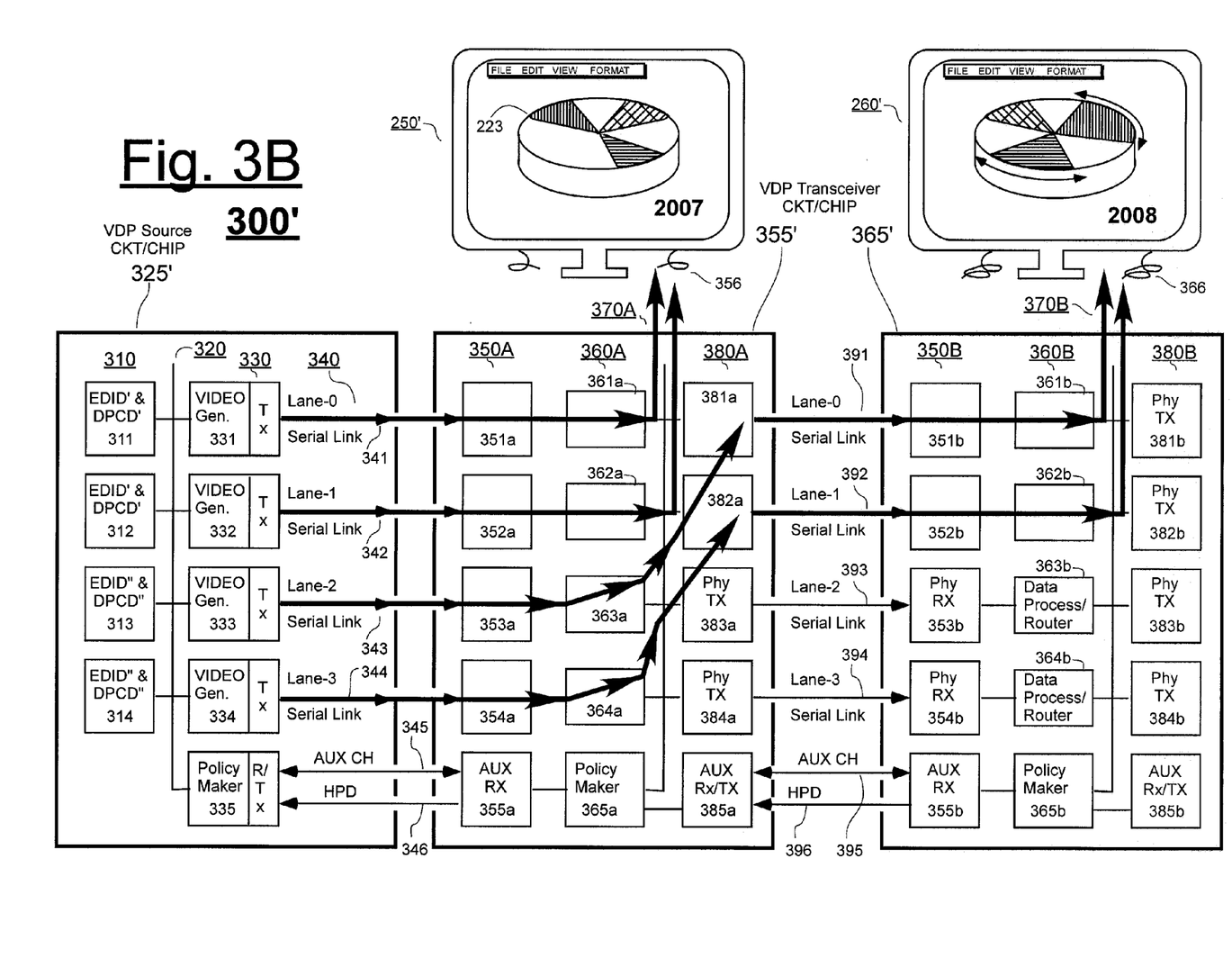
FIG. 3B is a signal flow diagram showing how video signals may be routed and distributed daisy-chain style to plural display units with the system shown in FIG. 3A.

Referring to FIG. 3B, video data streams that are not routed to the local monitor (e.g., 250') via the common routing bus (e.g., 370A) are instead routed in accordance with a bypass lane mapping algorithm to egress carrying Phy Tx units (e.g., 381a, 382a in FIG. 3B). In one embodiment, rerouting of the video stream data of the bypass lanes is automatically mapped based on the settings of the IN_ACTIVE_LANES and OUT_ACTIVE_LANES fields. Table 4 of section 5 gives an example of such automatically lane mapping. It is to be understood however that it is within the contemplation of the disclosure to allow for host controlled remapping (or no remapping) of video data between the ingress lanes and egress lanes of each transceiver device and/or to allow for host controlled coupling of ingressing video data within each transceiver device to its local monitor if so desired.

6.0 Automated Input and Output Lane Mapping 6.1 Automatic 2 Lane Mode with 2 Sink Devices in Chain Still referring to FIG. 3B, automated lane mapping may be carried out by the source device if desired so as to make data processing simpler for the host computer (220' of FIG. 3A). Accordingly, when there are four activatable lanes and two sink devices (e.g., 355', 365') detected as being plugged into the daisy chain, then in one embodiment, the source device (325') automatically configures the policy makers (e.g., 365a, 365b) of its sink devices (via commands 450 sent over the AUX CH 345, 395) to locally route the video streams of the respective lanes as shown in FIG. 3B. In one variation, the most downstream sink device may be a standard VDP sink device rather than a transceiving unit and the correct ones of its ingress lanes (e.g., 391, 392) will automatically receive the relayed video data from the upstream transceiving units (e.g., 355') in a transparent manner as if the most downstream sink device were the only sink device on the chain. The next more upstream transceiving unit (e.g., 355') appears to the next downstream unit (e.g., 365') as if it were a source device that providing just the terminal end video data (e.g., over lanes 391, 392).

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a further example, it is understood that the configuring of a source device (e.g., 325' of FIG. 3A) and/or of a transceiver device (e.g., 355' of FIG. 3A) in accordance with the disclosure can include use of a computer (e.g., 220' of FIG. 3A) or another external instructing device to selectively control activation or deactivation of the various video stream transmitters (e.g., Tx 331, Phy Tx 381a, Phy Tx 381b) in the video daisy chain and/or to selectively control remapping or local data processing of ingressing video data in each transceiver device as desired. A computer-readable medium (not shown) or another form of a software product or machine-instructing means (including but not limited to, a hard disk, a compact disk, a flash memory stick, a downloading of manufactured instructing signals over a network and/or the like) may be used for instructing the instructable machine (e.g., 220') to carry out such selective activation and deactivation processes as may be desired. For example in FIG. 4 it may be desirable to shut off or minimize power consumption by those of the Phy Tx units that are not routing video data to a next downstream device so as to thereby reduce total power consumption. Thus if software in the host computer indicates that video images are not being actively shown at the moment on certain ones of the daisy chain connected monitors, the host computer may selectively command power down of the video data outputting circuits whose services are not currently needed so as to thereby conserve power. Given this, it is within the scope of the disclosure to have an instructable machine (e.g., 220') carry out, and/to provide ancillary software adapted for causing the instructable machine to carry machine-implemented methods that vary from the default automatic video routing techniques described by above Table 4.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A video display apparatus for displaying an image represented by received video signals, the apparatus comprising:
   (a) a first port structured to receive a first plurality of serially transmitted digital signals representing one or more video images;
   (b) a second port structured to output a second plurality of serially transmitted digital signals representing one or more of the video images of said first port;
   (c) a relaying circuit coupled to the first and second ports, the relaying circuit comprising:
      a router that can selectively route part or all of one or more data streams representing at least part of one of the video images of said first port toward a local monitor or to said second port; and an auxiliary channel relay configured to bidirectionally relay serial auxiliary channel data, wherein the relayed auxiliary channel data includes Extended Display Identification Data (EDID) indicating physical attributes of at least one of one or more local monitors that can be operatively coupled to a daisy chain communication circuit defined by the auxiliary channel relay.

2. The video display apparatus of claim 1 wherein:
said first port includes a Video Electronics Standards Association (VESA) DisplayPort compatible first interface plug; and
said second port includes a VESA-DisplayPort compatible second interface plug.

3. The video display apparatus of claim 2 and further comprising:
a local monitor operatively coupled to the to the relaying circuit for displaying the image represented by one or more of the data streams that are selectively routed by the selective router toward said local monitor.

4. The video display apparatus of claim 1 wherein:
said relaying circuit includes a hot-plug detector that can detect when a second video display apparatus similar to said video display apparatus is connected daisy chain style to the second port.

5. A method of daisy chain connecting a plurality of video display units to a video source device where the video source device can output a first plurality of serially transmitted digital signals representing one or more video images, the method comprising:
(a) detecting when a first video sink device has been connected daisy chain style to a video signal relaying circuit driven by the video source device; and
(b) in response to said detection of the connection of the first video sink device, automatically assigning one or more of a first plurality of video carrying data lanes to serially carry video data stream signals representing an image or part of an image to be displayed by a monitor associated with the first video sink device; and
(c) in response to said detection of the connection of the first video sink device, automatically configuring other video sink devices that are interposed daisy chain style in the video signal relaying circuit between the video source device and the first video sink device to relay part or all of the video data stream signals of the lanes assigned to the first video sink device to the first video sink device and selectively routing part or all of the video data stream signals to the next-in-chain video sink device.

6. The daisy chain connecting method of claim 5 and further comprising:
(d) in response to said detection of the connection of the first video sink device, automatically reading local Extended Display Identification Data (EDID) data in the first video sink device where the local EDID data indicates physical attributes of at least one local display monitor associated with the first video sink device.

7. The daisy chain connecting method of claim 5 and further comprising:
(d) in response to said detection of the connection of the first video sink device, automatically reading local Display Port Configuration Data (DPCD) data in the first video sink device where the local DPCD data indicates a current reconfigurable configuration of at least one local display monitor associated with the first video sink device.

8. A daisy chain transceiver device comprising:
(a) a first plurality of video stream data receivers each structured to receive video stream data serially transmitted over a corresponding ingress serial data link and to deserialize the received video stream data;
(b) a second plurality of video stream data routers each coupled and structured to receive deserialized video stream data output by a corresponding one of the video stream data receivers and to selectively route part or all of the deserialized video stream to a programmably defined destination;
(c) a third plurality of video stream data transmitters each coupled and structured to receive routed data from one of the video stream data routers and to serialize the routed data and to serially transmit the reserialized data over a corresponding egress serial data link; and
(d) a local output port coupled and structured to receive routed data from one or more of the video stream data routers and to forward the routed and locally received data to a local display monitor.

9. The daisy chain transceiver device of claim 8 and further comprising:
(e) a local policy maker structured to store local Display Port Configuration Data (DPCD) data and local Extended Display Indentification Data (EDID) data; and
(f) auxiliary channel data transceivers coupled to the local policy maker and structured to relay auxiliary channel data upstream and downstream of the daisy chain transceiver device.

10. The daisy chain transceiver device of claim 9 wherein:
(e.1) said local policy maker includes an extended DPCD register set having a daisy chain support register which contains an extended syntax flag for indicating whether an extended AUX_CH syntax is being currently implemented by the daisy chain transceiver device.

11. The daisy chain transceiver device of claim 9 wherein:
(e.1) said local policy maker includes an extended DPCD register set having a daisy chain support register which contains a sink device identification field that can provide the daisy chain transceiver device with a unique device identification distinguishing the daisy chain transceiver device from other sink devices along a daisy chain that the daisy chain transceiver device is connected to as a sink device.

12. The daisy chain transceiver device of claim 9 wherein:
(e.1) said local policy maker includes an extended DPCD register set having a daisy chain support register which contains an active ingress lanes indicator filed for indicating which of said first plurality of video stream data receivers is coupled to a currently active ingressing video lane.

13. The daisy chain transceiver device of claim 9 wherein:
(e.1) said local policy maker includes an extended DPCD register set having a daisy chain support register which contains an active egress lanes indicator filed for indicating which of said third plurality of video stream data transmitters is coupled to a currently active egressing video lane.

14. The daisy chain transceiver device of claim 9 wherein:
(e.1) said local policy maker includes an extended DPCD register set having a daisy chain support register which contains a 24 bit unit identification field for uniquely identifying the daisy chain transceiver device as an organizational unit within a predefined organization of other uniquely identifiable units.

15. The daisy chain transceiver device of claim 9 wherein:
(f.1) said auxiliary channel data transceivers are further structured to relay hot-plug detection signals from downstream sink devices along the daisy chain in which the daisy chain transceiver device resides to upstream devices.

16. The daisy chain transceiver device of claim 9 wherein:
(e.1) said local policy maker is structured to respond to command packets relayed to it by way of one or more auxiliary channel data transceivers when the command packet contains a destination identification field designating the daisy chain transceiver device as a target of the command.

17. The daisy chain transceiver device of claim 9 wherein:
(e.1) said local policy maker is structured to output command response packets by way of one of its auxiliary channel data transceivers where the command response packet contains a sink device identification field designating the daisy chain transceiver device as the source of the command response packet.

18. A daisy chain supporting source device comprising:
(a) a first plurality of video stream data generators each structured to formulate video stream data for serial transmission over a corresponding egress serial data link and to serialize the formulated video stream data prior to output;
(b) a second plurality of video data stream control units each coupled to a respective one of said video stream data generators and structured to control the formulation of said video stream data for serial transmission so that the formulation is compatible with a target display monitor that is intended to display an image represented by the video data stream, the video data stream control units being programmable so as support different ones of target display monitors; and
(c) a source side policy maker structured to retrieve local Display Port Configuration Data (DPCD) data and local Extended Display Identification Data (EDID) data from a plurality of daisy chain connected monitors and to store the retrieved DPC data and EPI data in said second plurality of video data stream control units.

19. The daisy chain supporting source device of claim 18 and further comprising:
(d) a host interface port operatively coupled to the source side policy maker and to the first plurality of video stream data generators for enabling an external host device to download video data into the video stream data generators and to interact with the source side policy maker.

20. The daisy chain supporting source device of claim 18 wherein each video stream data generator includes a graphics data processor and a video data storage memory.

21. The daisy chain supporting source device of claim 18 wherein:
(c.1) said source side policy maker includes an extended DPCD register set having a daisy chain support register which contains an extended syntax flag for indicating whether an extended AUX_CH syntax is being currently implemented by the daisy chain supporting source device.

22. The daisy chain supporting source device of claim 18 wherein:
(c.1) said source side policy maker includes an extended DPCD register set having a daisy chain support register which contains a 24 bit unit identification field for uniquely identifying the daisy chain supporting source device as an organizational unit within a predefined organization of other uniquely identifiable units.

23. The daisy chain supporting source device of claim 18 wherein:
(c.1) said source side policy maker is structured to output command packets by way of an auxiliary data channel where the command packets each contains a destination device identification field designating a daisy chain connected device that is intended to respond to the command packet.

24. The daisy chain supporting source device of claim 23 wherein:
(c.2) said source side policy maker is structured to receive command response packets by way of the auxiliary data channel where the command response packets each contains a responder identification field designating a daisy chain connected device that is the source of the command response packet.

\* \* \* \* \*